United States Patent
Brown

(10) Patent No.: US 6,304,421 B1
(45) Date of Patent: Oct. 16, 2001

(54) VOICE COIL MOTOR PLATE FOR A DISC DRIVE

(75) Inventor: Timothy Ronald Brown, Denver, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/312,673

(22) Filed: May 17, 1999

Related U.S. Application Data

(60) Provisional application No. 60/116,612, filed on Jan. 21, 1999.

(51) Int. Cl.[7] .............................. G11B 5/55; G11B 21/08
(52) U.S. Cl. .......................................... 360/264.8
(58) Field of Search ............................. 360/264.8, 264.7; 310/12, 15, 36

(56) References Cited

U.S. PATENT DOCUMENTS

| | | | |
|---|---|---|---|
| 5,122,702 | * | 6/1992 | Nakazato ............................... 310/13 |
| 5,260,618 | | 11/1993 | Dunfield et al. . |
| 5,315,466 | | 5/1994 | Nishimoto et al. . |
| 5,329,267 | * | 7/1994 | Endoh et al. ........................ 335/222 |
| 5,654,848 | | 8/1997 | Maiers et al. . |
| 5,659,215 | | 8/1997 | Dunfield et al. . |
| 5,872,688 | | 2/1999 | Battu et al. . |

FOREIGN PATENT DOCUMENTS

| | | | |
|---|---|---|---|
| 2-119564 | * | 5/1990 | (JP) . |
| 96/04656A1 | * | 2/1996 | (WO) . |

* cited by examiner

*Primary Examiner*—William Klimowicz
(74) *Attorney, Agent, or Firm*—John B. Phillips; Merchant & Gould PC

(57) ABSTRACT

A disc drive includes a case defining a maximum interior height for mounting a voice coil motor within the disc drive. The voice coil motor includes a magnet, a coil, and top and bottom plates for carrying magnetic flux in a circuit with the magnet. At least one of the top and bottom plates includes a raised central portion having an increased cross-sectional area in relation to the remainder of the plate for carrying additional magnetic flux at a point where the plate experiences peak levels of magnetic flux. An opening formed in the disc drive case accommodates the raised central portion of the plate without altering the overall height of the case. The height of the raised central portion is preferably substantially equal to a thickness of the case to ensure the raised central portion fits flush within the opening. One or both of the top and bottom plates may include the raised central portion, thereby necessitating openings in one or both of a top cover and a lower base portion of the disc drive.

19 Claims, 8 Drawing Sheets

VOICE COIL MOTOR PLATE FOR A DISC DRIVE

RELATED APPLICATIONS

The present application claims the benefit of U.S. Provisional Application No. 60/116,612 entitled MODIFIED VOICE COIL MOTOR TOP POLE, filed Jan. 21, 1999.

FIELD OF THE INVENTION

The present invention relates to voice coil motors for disc drives. More particularly, the present invention relates to a voice coil motor plate having a non-uniform cross section for increasing the magnetic flux capacity of the plate without increasing the size of the disc drive.

BACKGROUND OF THE INVENTION

Disc drives employ a variety of means for moving a head/arm assembly across a magnetic medium. Demands for increased performance and capacity have lead to the nearly exclusive use of rotary voice coil motor ("VCM") actuators as the motive force for moving the head/arm assembly.

A rotary VCM typically includes a coil of wire positioned between opposing fixed magnetic structures. The fixed magnetic structures include one or more magnets connected to plates (also referred to as "poles" by those skilled in the art) which are fabricated from magnetically permeable material such as steel. The wire coil is shaped to include two opposing radial arms (FIG. 1) which allow direct current to pass in opposite directions through the radial arms. A magnetic field generated by the direct current passing through each radial arm interacts with the permanent magnetic field to apply a motive force to the radial arm. However, movement of the coil between the magnetic structures is limited so that each opposing arm experiences an opposite magnetic flux (FIG. 2). The current flowing in opposite directions through the two arms cooperates with the opposite magnetic flux experienced by each radial arm to ensure that the motive force applied to the two radial arms is cumulative.

Sophisticated control logic applies a precise amount and polarity of direct current to the windings within the coil to controllably move the coil within the fixed magnetic field. The coil and the head/arm assembly of the disc drive are attached on opposite sides of a pivot shaft (FIG. 1) to move the head/arm assembly across the magnetic medium in response to movement of the coil. The speed with which the coil moves between the fixed magnetic structures of the VCM, and thus the speed or "access time" of the disc drive, depends on the torque capability of the VCM. This torque capability depends in turn on a number of factors including the size and strength of the permanent magnet, the number of windings contained within the coil, the amount of power applied to the coil and the size of the plates above and below the coil, among others.

FIG. 2 illustrates a schematic of a prior art VCM comprising a top plate 20, a magnet 22, a coil 24 (shown in section) and a bottom plate 26. The magnet 22 is divided along a centerline 27 between North and South poles 28 and 30, respectively, and flux lines 32 illustrate the magnetic circuit between the poles of the magnet 22 and the plates 20 and 26. An air gap 34 between the magnet 22 and the bottom plate 26 allows for movement of the coil 24 within the fixed magnetic field. The total height dimension or vertical space allotted for the VCM (i.e., the distance between the top of the top plate 20 and the bottom of the bottom plate 26) is commonly referred to as the "z-height" of the VCM.

The desire to increase the access time for disc drives conflicts with a further desire to reduce the size of such drives. Indeed, relatively small hard drives (e.g., drives approximately 1 cm high) are highly desirable for use with notebook or smaller-sized computers. Because the VCM typically fits within an outer casing of the disc drive, the z-height for the VCM of a small disc drive will be less than 1 cm. Thus, a number of compromises are typically necessary in the design of a VCM. For example, in order to increase the size (and thus the power) of both the magnet 22 and the coil 24, the thickness of the top and bottom plates 20 and 26 may be reduced to the point where magnetic flux leaks outside of the plates 20 and 26, as designated by the arrows 36 in FIG. 2.

Flux leakage 36 occurs when the flux density within the plates 20 and 26 exceeds the maximum flux density for the particular material (e.g., a flux density of 18,000 Gauss for steel). Flux leakage 36 is highly undesirable since the leakage of the magnetic flux outside of the closed VCM circuit reduces the power of the VCM (thereby increasing the access time) while simultaneously interfering with the electronic circuitry and the magnetic medium within the disc drive. Because the magnetic flux within a VCM depends on the strength of the magnet 22, the flux density within the plates 20 and 26 increases as the thickness of the plates decreases. Thus, FIG. 2 illustrates the case where the thickness of the plates 20 and 26 is too small to handle the flux within the VCM.

The flux leakage can further be illustrated by plotting the flux density over the length or angle of the plates 20 and 26. Due to the rotary nature of the VCM, both the plates 20, 26 and the magnet 22 are curved to follow the arcuate path of the coil 24. FIG. 3 illustrates a prior art top plate 20 and magnet 22 and further defines an angle $\Theta$ determined by the arc of the magnet 22. FIG. 4 illustrates the linear increase of the flux density within the plate 20 from a point adjacent each end of the plate 20 to the middle of the plate (i.e., from $\pm\Theta/2$ to a 0° angle as shown in FIGS. 3 and 4). FIG. 4 further illustrates that the peak flux at the middle of the plate 20 exceeds the maximum flux density that can be accommodated by the steel plate 20 as designated by the horizontal line 38. Thus, FIG. 4 graphically illustrates the flux leakage 36 shown schematically in FIG. 2.

One method of reducing flux leakage is to simply increase the cross-sectional area of the plates 20 and 26. Due to the cramped conditions within the disc drive and other constraints on the shape of the plates, the cross-sectional area of the plates 20 and 26 is typically increased by increasing the height of the plates. For example, the height of the plates 20 and 26 in FIG. 2 could be increased until the peak flux density in FIG. 4 was lower than the maximum flux density of the steel plates 20 and 26 (i.e., below the dashed line 38). However, as noted above, all the components of a VCM must fit within the maximum z-height allotted within the disc drive. Therefore, increasing the height of the plates 20 and 26 to reduce flux leakage necessitates a corresponding reduction in the size of the magnet 22, the coil 24, or both, with a resulting reduction in the power of the VCM. This tradeoff between the size of the different components within a VCM requires a careful optimization process to maximize the power of the VCM for a given z-height.

FIGS. 5 and 6 illustrate one prior art method of increasing VCM power by increasing the available z-height of the VCM. In essence, an opening 40 is formed in a top cover 42 of a prior art disc drive to allow the entire top plate 20 to protrude upward through the opening 40. The z-height of the VCM is thus increased by the thickness of the top cover 20, and a label or other adhesive covering (not shown) is then placed over the opening 40 to maintain the airtight seal within the disc drive. Although the top cover 42 is only approximately 0.5 millimeters thick, this small thickness can account for approximately a 7% increase in the effective z-height for small disc drives such as a 9.5 millimeter drive which has a nominal VCM z-height of 7.2 millimeters.

Because the opening 40 must be sufficiently large to accommodate the entire top plate 20, the size of the opening 40 makes it difficult to maintain an airtight seal within the disc drive. First, due to the tight fit of the top plate 20 within the disc drive, at least one edge 44 of the opening 40 is formed immediately adjacent an edge 46 of the top cover 42. The small surface area along the edge 46 reduces the structural integrity of the top cover 42 and can lead to deformation of the top cover 42, particularly in light of the pressure applied to the top cover 42 by a gasket 48 (FIG. 6) which fits between the top cover 42 and a base 50 of the disc drive to hermetically seal the disc drive. Similar structural weaknesses may be experienced along a second edge 52 and an intermediate corner 54 of the top cover 42 depending on the shape of the opening 40.

A further problem relates to sealing the opening 40 to maintain the hermetic seal within the disc drive. In essence, the surface area between the opening 40 and the edges 46 and 52 of the top cover 42 often proves inadequate to hold an edge of a sticker or other adhesive covering (not shown). Of course, should such an adhesive covering pull away from the edges 46 and 52 of the top cover, the interior of the disc drive would be exposed to harmful contaminants such as dust or smoke that can cause a disc crash. Thus, the prior art solution of extending the entire VCM top plate 20 through an opening 40 in the top cover 42 leads to problems with both the structural integrity of the top cover and the ability to maintain a hermetic seal within the disc drive.

It is with respect to these and other background considerations, limitations and problems that the present invention has evolved.

SUMMARY OF THE INVENTION

The present invention provides apparatus for increasing the magnetic flux capacity and thus the power of a voice coil motor for a disc drive without increasing the height of the disc drive.

In accordance with a preferred embodiment of the present invention, a disc drive is provided with a case defining a maximum interior or z-height for mounting a voice coil motor within the disc drive. The voice coil motor includes a magnet, a coil attached to the case to move relative to the magnet, and top and bottom plates centered in position above and below the magnet, respectively. The top and bottom plate formed from a magnetically permeable material to carry magnetic flux in a circuit with the magnet. At least one of the top and bottom plates includes a raised central portion having an increased cross-sectional area in relation to the remainder of the plate to increase the magnetic flux capacity of the central portion of the plate. An opening formed in the disc drive case accommodates the raised central portion of the plate, thereby increasing the effective height of the plate without altering the outer dimensions of the disc drive.

A further preferred embodiment of the disc drive of the present invention includes a voice coil motor where both the top and the bottom plates include a raised central portion for carrying additional magnetic flux within the circuit defined by the plates and the magnet. A base of the disc drive includes an opening for receiving the raised central portion of the bottom plate while a top cover of the disc drive includes an opening for receiving the raised central portion of the top plate.

The preferred embodiment of the present invention further includes a voice coil motor for a disc drive which includes a case for sealing an interior volume of the disc drive. The voice coil motor includes a magnet, a coil adapted to move relative to the magnet, and top and bottom plates centered above and below the magnet, respectively. At least one of the top and bottom plates includes a raised central portion which provides extra cross-sectional area for carrying additional magnetic flux at a point where the plate experiences peak levels of magnetic flux from the magnet. The height added by the raised central portion of the plate is preferably substantially equal to a thickness of the disc drive case so that the raised central portion of the plate is received in a flush manner by an opening formed in the disc drive case.

These and various other features as well as advantages which characterize the present invention will be apparent from a reading of the following detailed description and a review of the associated drawings.

DETAILED DESCRIPTION

Figure 1:
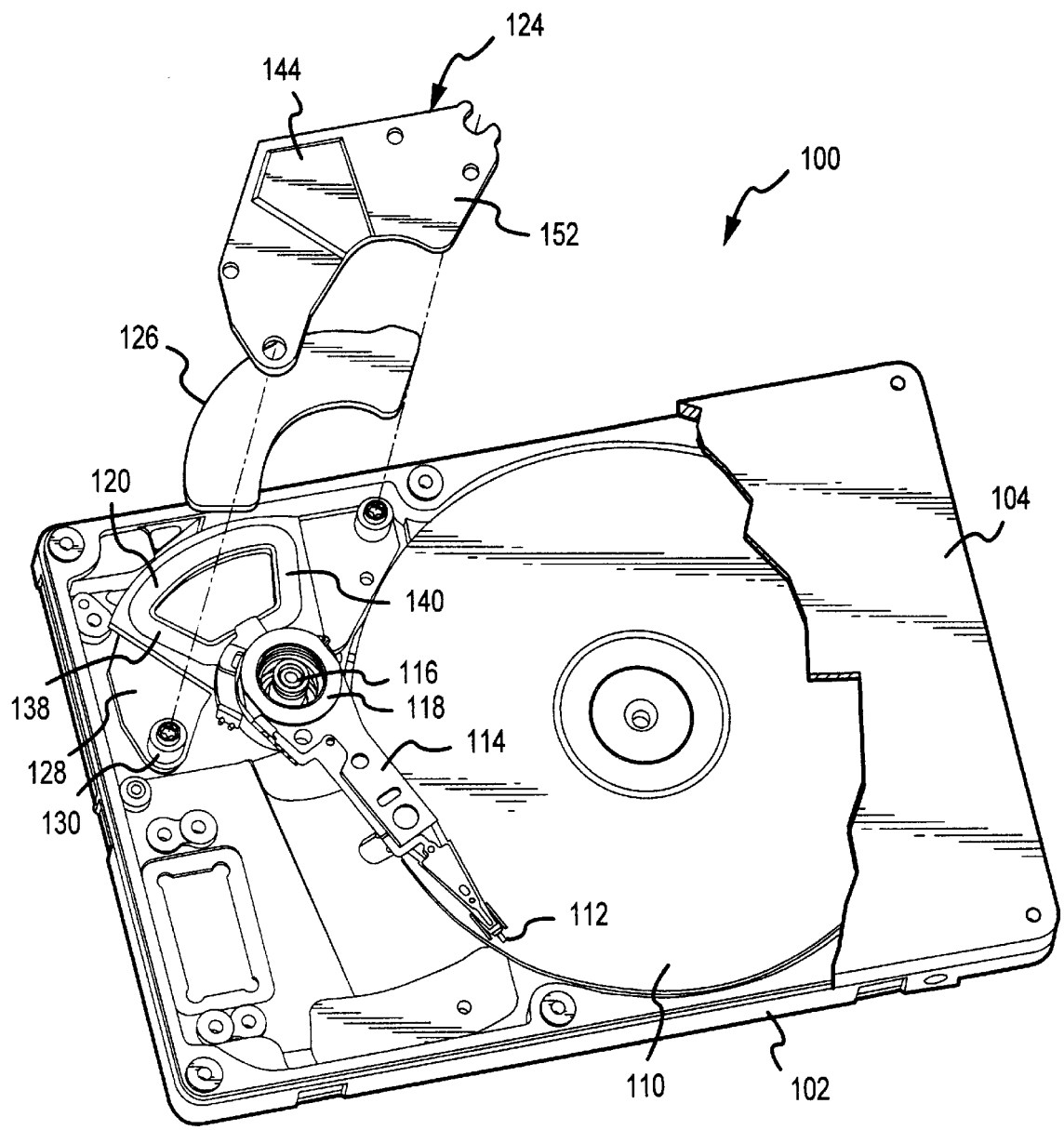
FIG. 1 is an isometric view of a disc drive with portions cut away and with elements of a voice coil motor exploded to illustrate the present invention.

FIG. 1 illustrates an isometric, exploded view of a disc drive 100 comprising a base 102 and a top cover 104. A gasket 106 (shown in phantom in FIG. 11) fits between the base 102 and the top cover 104 to form a hermetically sealed interior volume within the drive 100. For purposes of describing the preferred embodiment of the present invention, the example disc drive 100 represents a 9.5 millimeter drive for use in notebook computers or other applications requiring a disc drive with a small form factor.

The base 102 provides a mount for a spindle motor (not shown) which, in turn, rotates at least one disc 110. The disc 110 contains a plurality of circular, concentric tracks for recording and storing data. A vertical array of heads 112 are moved between the different tracks on opposite sides of the disc 110 by an array of arms 114 which are each connected to a pivot shaft 116 by an actuator body 118. A coil 120 is also connected to the actuator body 118 on an opposite side of the pivot shaft 116 so that movement of the coil 120 results in movement of the heads 112 across the surface of the disc 110.

Figure 7:
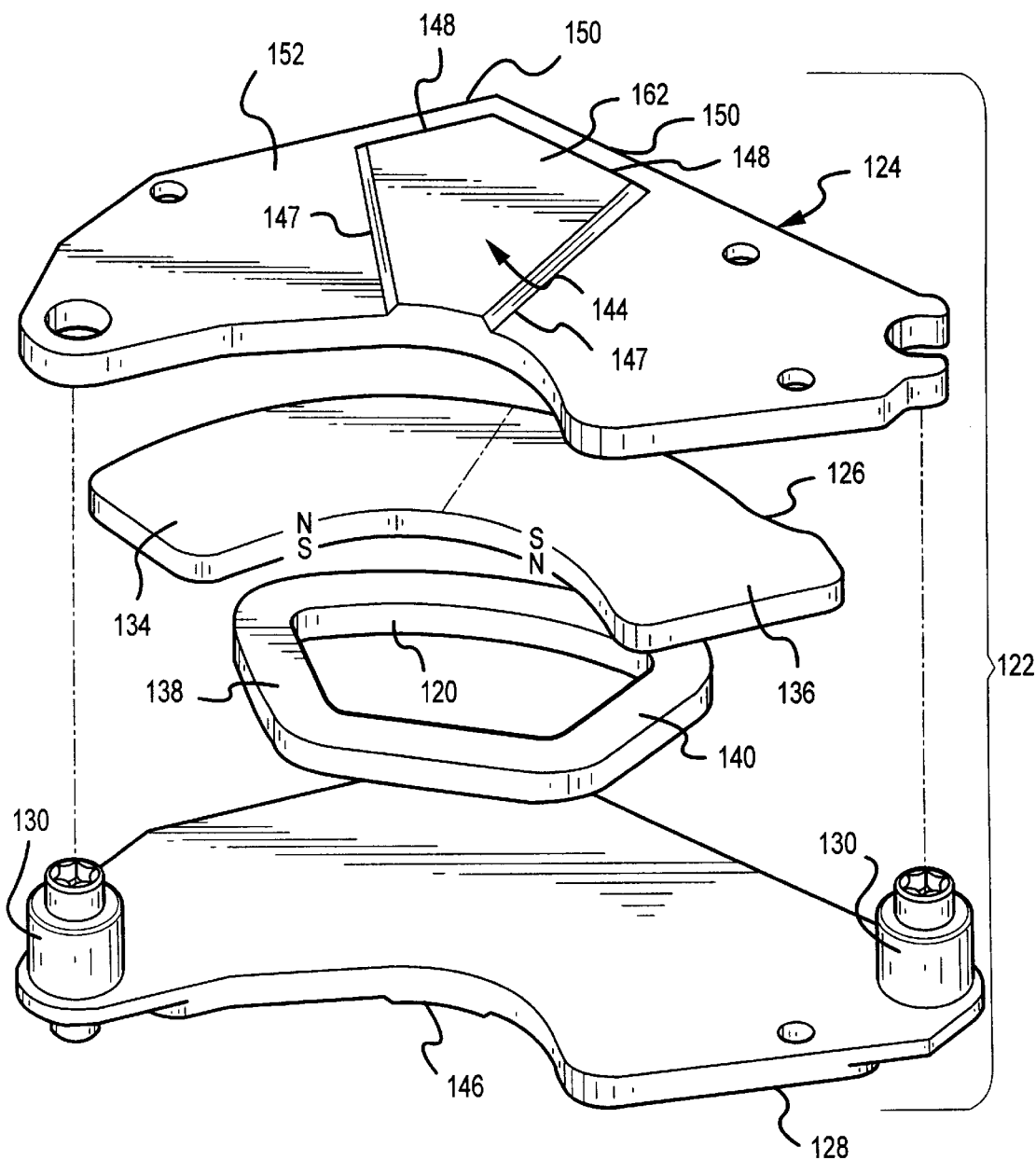
FIG. 7 is an exploded view of a voice coil motor of the present invention illustrating preferred embodiments of top and bottom plates.
Figure 8:
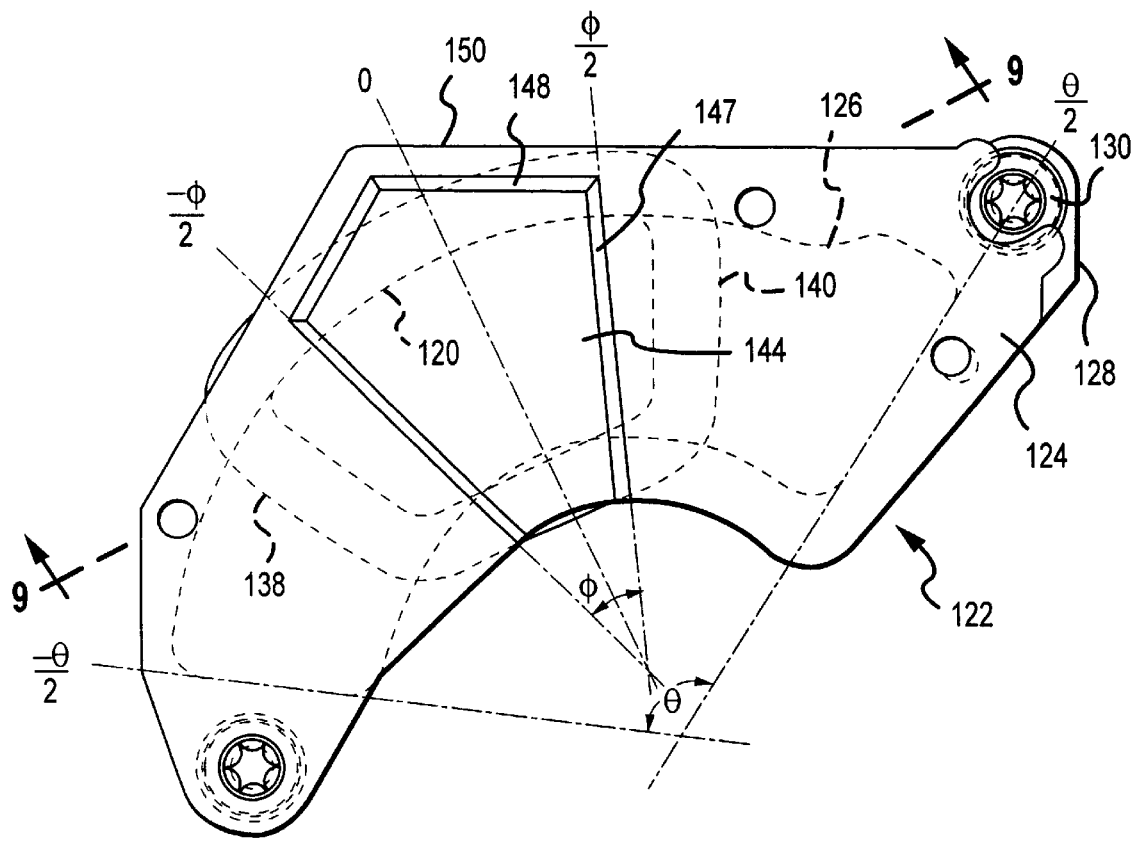
FIG. 8 is a top view of the voice coil motor illustrated in FIG. 7.
Figure 9:
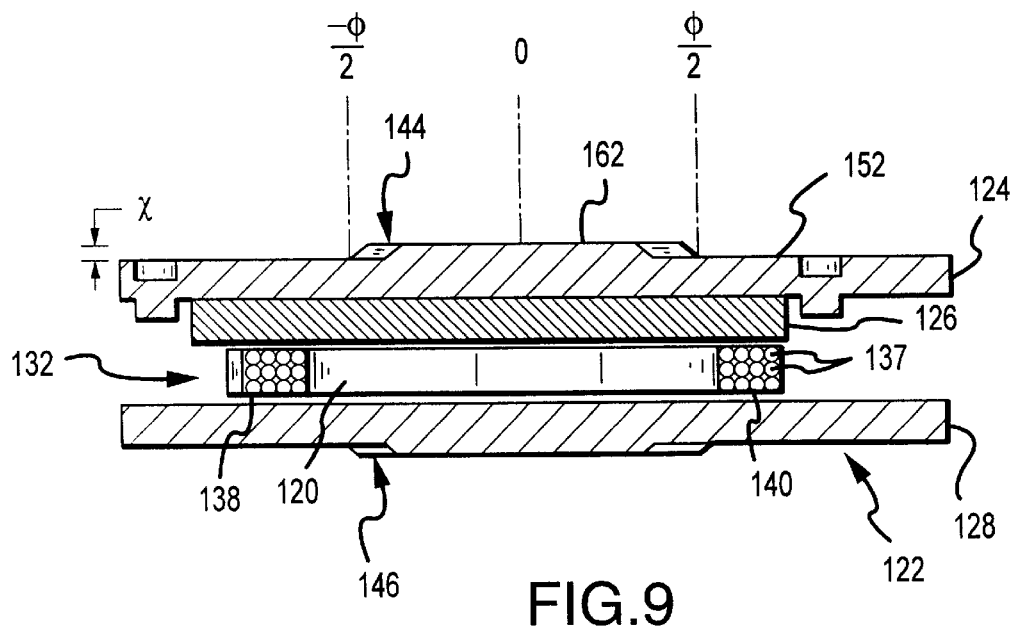
FIG. 9 is a section view taken substantially along the line 9—9 in FIG. 8.

FIGS. 7–9 illustrate that the coil 120 is one element of a voice coil motor ("VCM") 122 which provides the motive force for the coil 120 and thus the heads 112 of the disc drive. The VCM 122 further includes a top plate 124, a magnet 126 and a bottom plate 128. The top plate 124 and magnet 126 are essentially fixed together and are separated from the bottom plate 128 by spacers 130 to define an air gap 132 between the magnet 126 and the bottom plate 128. The air gap 132 provides sufficient clearance for the coil 120 to pivot within a horizontal plane about the shaft 116.

The magnet 126 is divided between North and South poles 134 and 136 (FIG. 7), respectively. In this manner, the magnet 126 and the plates 124 and 128 cooperate to form a magnetic circuit in the typical manner of a VCM 122. It is understood that while only a single magnet 126 is utilized within the preferred embodiment, an additional magnet (not shown) could be fixed to the bottom plate 128 to further increase the strength of the magnetic field within the VCM 122.

Direct current applied to windings 137 (FIG. 9) running through the coil 120 creates magnetic fields about opposing radial arms 138 and 140 of the coil 120. Due to the opposite direction of the direct current within each of the arms 138 and 140, the arms generate opposite magnetic fields with respect to one another. However, the position of the arms 138 and 140 beneath the respective North and South poles 134 and 136 of the magnet 126 ensures that the opposite magnetic fields generated by the arms create a similarly directed force vector on each of the arms 138 and 140. Thus, the controlled application of direct current through the windings 137 of the coil 120 causes the coil to move relative to the stationary components of the VCM (i.e., the plates 124 and 128 and the magnet 126). This arcuate motion of the coil 120 about the pivot shaft 116 causes a corresponding arcuate motion of the heads 112 across the disc 110.

FIG. 8 illustrates that the magnet 126 and the plates 124 and 128 are preferably curved to follow the arcuate motion of the coil 120 and to ensure a constant magnetic field over the maximum arc traversed by the coil 120. The curved magnet 126 preferably covers an arc defined by the angle Θ so that the ends of the magnet 126 are designated as ±Θ/2 and a middle 0° angle bisects both the plates 124 and 128 as well as the magnet 126 (i.e., the 0° angle divides the magnet 126 between the North and South poles 134 and 136, respectively).

The plates 124 and 128 are made from a magnetically permeable material having a relatively high capacity for magnetic flux. The preferred embodiment of the plates 124 and 128 are formed from C1008 steel having a maximum flux density capacity of approximately 18,000 Gauss. However, as recognized in FIG. 4 with respect to the prior art plate 20, all the magnetic flux within the circuit must pass through the middle portion (i.e., the 0° position) of the plates 124 and 128. Thus, the plates 124 and 128 preferably include raised central portions 144 and 146, respectively, to better accommodate the high levels of magnetic flux adjacent the 0° position. Although FIGS. 7 and 8 illustrate only the raised central portion 144 of the top plate 124, it is understood that the raised central portion 146 (FIG. 9) of the bottom plate 128 is shaped similar to the portion 144.

FIG. 8 illustrates that the raised central portion 144 covers an arc-shaped portion of the top plate 124 on either side of the 0° position (i.e., the centerline of the magnet 126), thereby defining an angle Φ with opposing side edges 147 of the portion 144 denoted by angles ±Φ/2. However, the raised central portion 144 preferably does not extend across the entirety of the top plate 124. Rather, rear edges 148 of the raised portion 144 terminate prior to rear edges 150 of the top plate 124 (FIGS. 7 and 8) as described in greater detail below. In the preferred example of the 9.5 millimeter disc drive 100, the rear edges 148 of the raised central portion 144 preferably terminate at least 1 millimeter from the edges 150 of the top plate 124.

The section view of the top plate 124 in FIG. 9 illustrates that the central portion 144 extends a distance x above a nominal top surface 152 of the top plate 124. The distance x is preferably equal to the thickness of the top cover 104 and, in the preferred embodiment where the top cover 104 is formed from aluminum, the distance x is equal to approximately 0.5 millimeters. Additionally, the nominal height of the top plate 124 on either side of the raised portion 144 is preferably 1.65 millimeters for the example 9.5 millimeter disc drive described in the drawings. Thus, the height (and therefore the cross-sectional area) of the central portion of the top plate 124 is approximately 30% greater than the remainder of the top plate.

Figure 2:
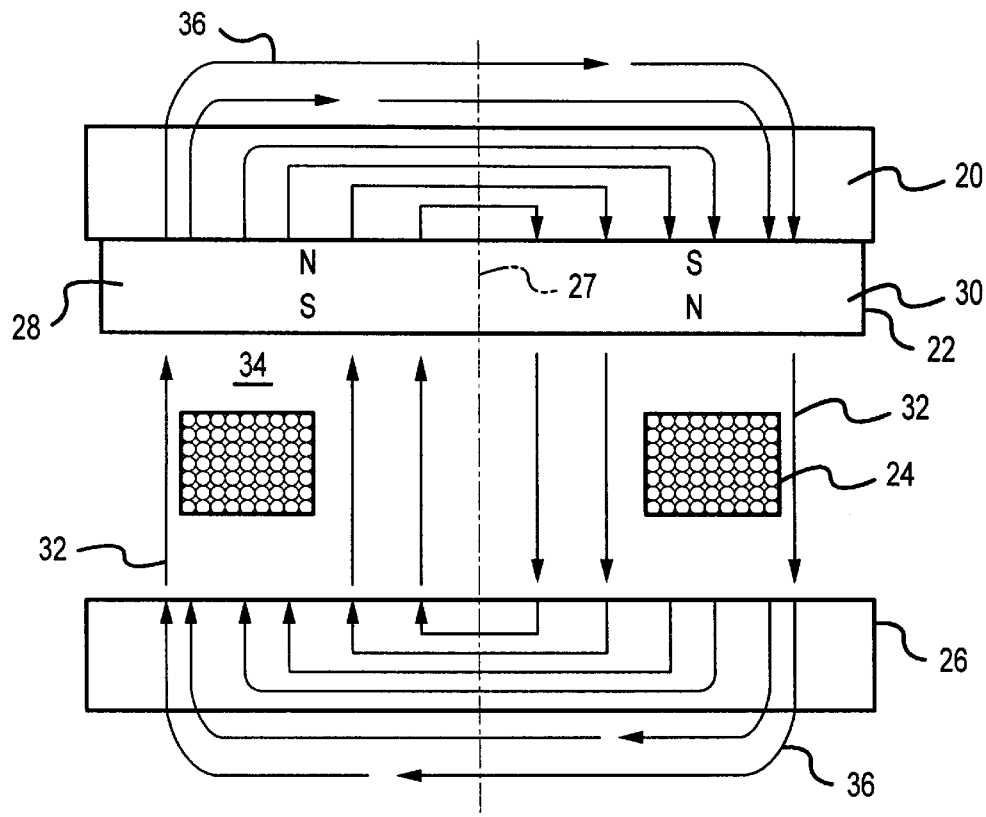
FIG. 2 is a schematic representation of a prior art voice coil motor for a disc drive illustrating flux leakage from top and bottom plates of the voice coil motor.
Figure 3:
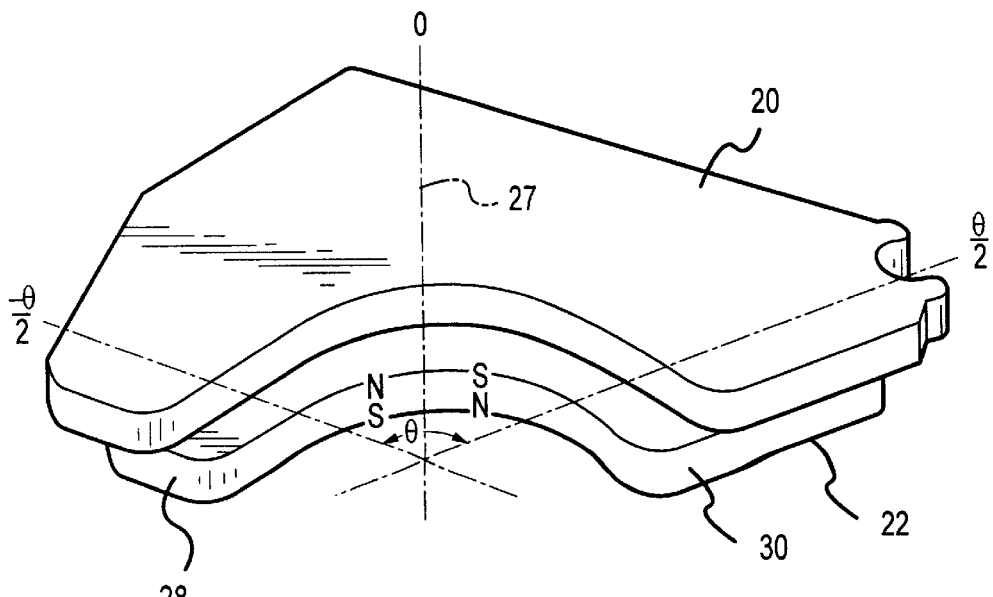
FIG. 3 is an isometric view of a top plate and magnet of a prior art voice coil motor.
Figure 4:
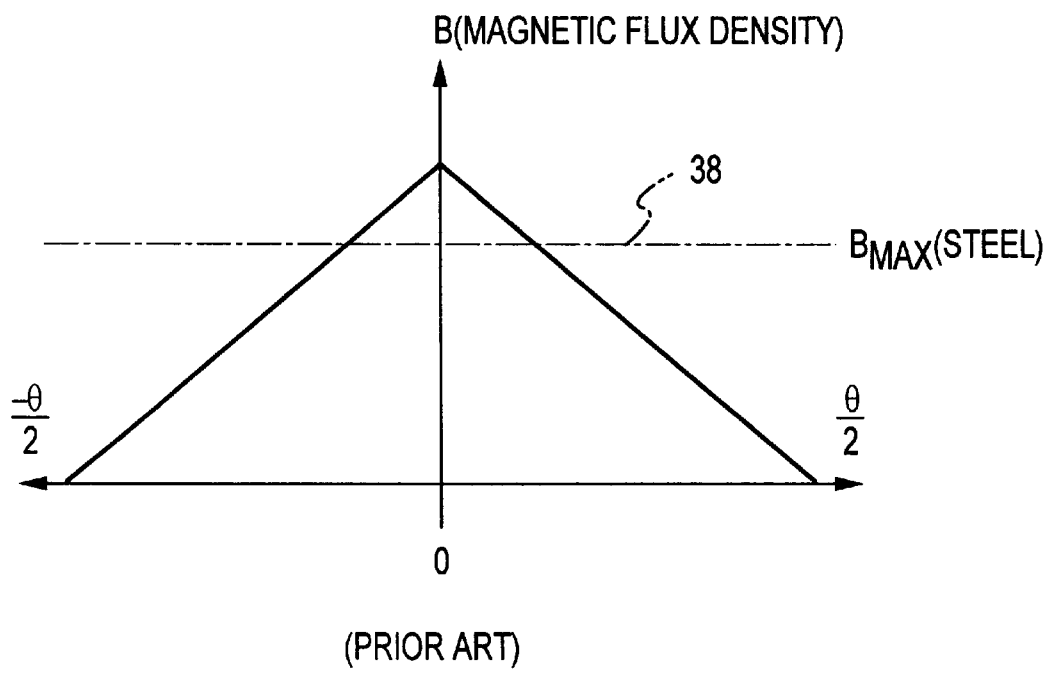
FIG. 4 is a graph of flux density along the length of the prior art top plate shown in FIG. 3.
Figure 10:
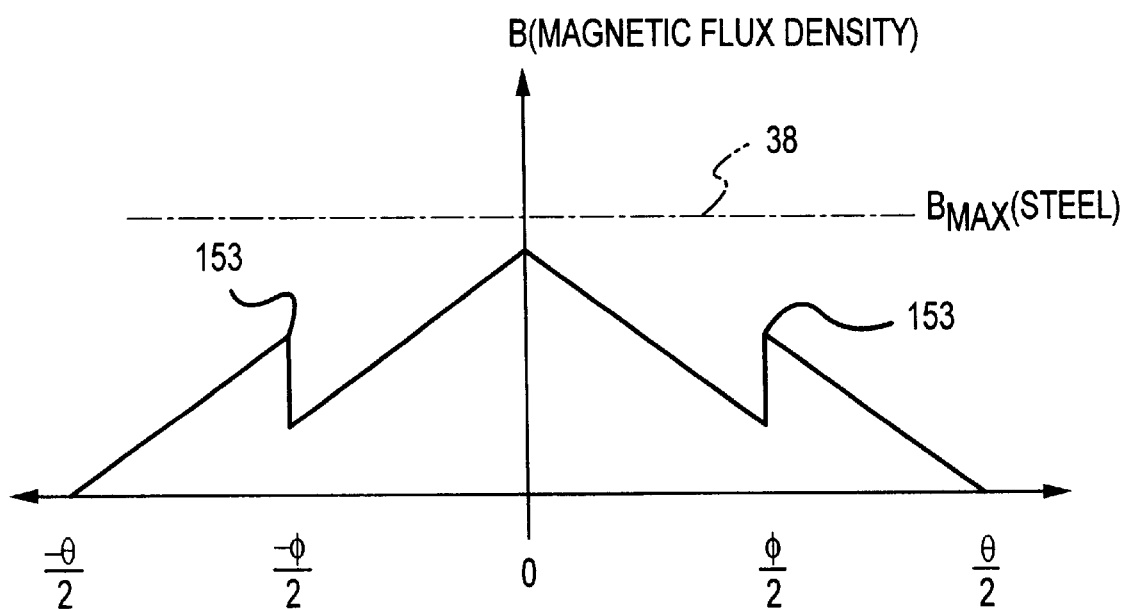
FIG. 10 is a graph of flux density along the length of the top plate shown in FIG. 7.

The increased cross-sectional area results in a reduction of the magnetic flux density along the raised central portion 144 of the top plate 124. This phenomenon is demonstrated in the graph of FIG. 10 where the flux density drops dramatically at the angles ±ΦD/2 before continuing to a peak value at the 0° position. Thus, while a uniform top plate (such as the prior art plate 20 in FIG. 2) having a nominal height of 1.65 millimeters would likely result in flux leakage as shown in FIG. 4, the top plate 124 of the present invention has an effective height of approximately 2.15 millimeters along the portion of the top plate 124 which experiences the most magnetic flux (i.e., along the angle φ). FIG. 10 illustrates that this greater effective height results in a lower peak flux density which falls within the flux density capacity of steel, as shown by the line 38. Of course, the surface area of the raised central portion 144 must be sufficiently large to prevent magnetic flux from leaking from the plate 124 before encountering the raised central portion 144. That is, the angle Φ must be sufficiently large to ensure that the flux density within the top plate 124 does not exceed the maximum capacity of steel at an angle greater than ±φ/2 (i.e., the angle Φ must be large enough to ensure that the peaks 153 in the graph of FIG. 10 are below the line 38). In the preferred embodiment where the angle Θ is approximately 100°, the angle φ is approximately 40° or approximately 40% of the angle Θ, although Φ angles in the range of 30–60° or 30–60% of the angle Θ have also been found acceptable.

FIG. 9 illustrates that the raised central portion 144 is preferably formed integrally with the remainder of the plate 124, such as by a coining operation where the steel plate 124 is heated and then stamped into a die. To facilitate such a coining operation, the edges 147 and 148 of the portion 144 are preferably formed at an angle of 45°, although it is understood that other edge angles or shapes fall within the scope of the present invention. Indeed, those skilled in the art may utilize alternative shapes for the raised central portion 144 provided that the angle Φ and the height of the central portion 144 are both great enough to prevent the peak flux density within the plate 124 from substantially exceeding the maximum flux density capacity of steel (i.e., 18,000 Gauss).

Figure 11:
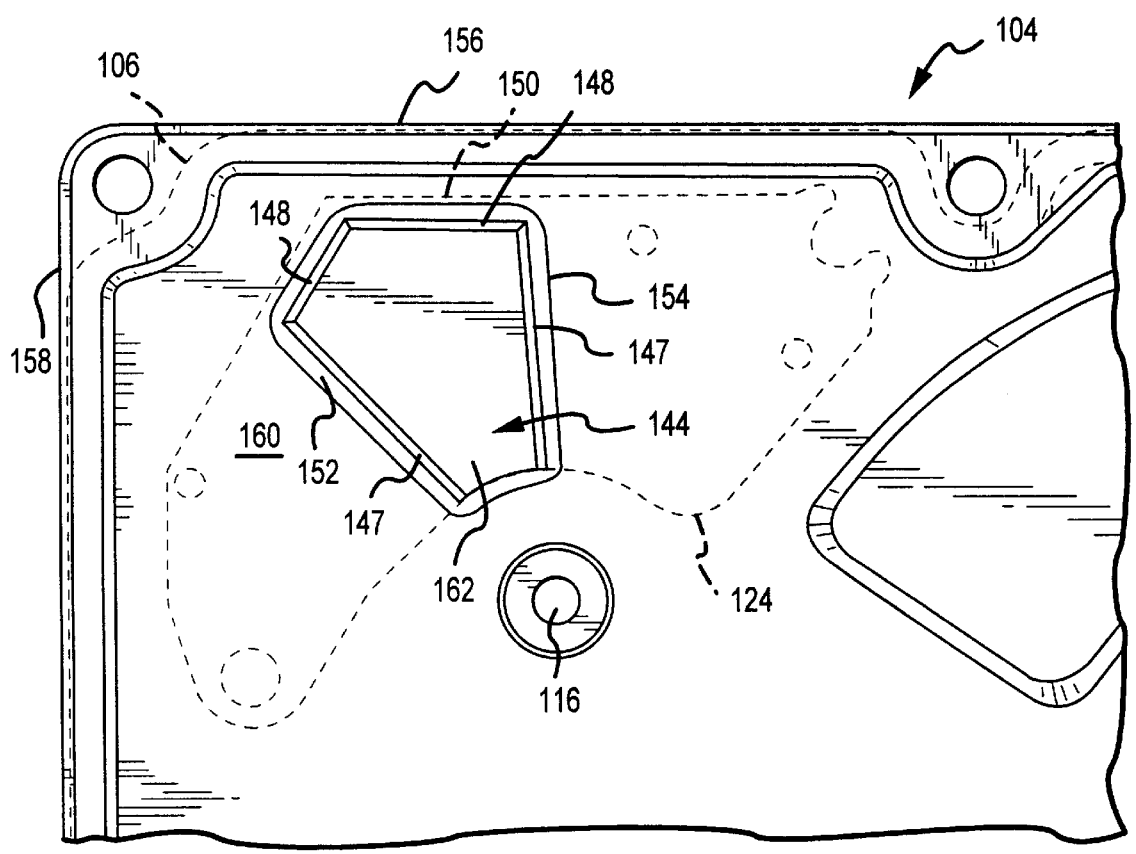
FIG. 11 is a top plan view similar to FIG. 6 illustrating an opening within a top cover of the present invention for receiving a portion of the top plate shown in FIG. 7.

The top cover 104 of the disc drive 100 preferably includes an opening 154 for receiving the raised central portion 144 of the top plate 124, as shown in FIG. 11. The opening 154 is preferably shaped to substantially match the dimensions of the raised central portion 144, thereby minimizing the size of the opening while simultaneously maximizing the surface area between the opening 154 and edges 156 and 158 of the top cover 104. The enhanced surface area surrounding the opening 154 provides more than adequate space for a label or other adhesive covering (not shown) to be applied to an outer surface 160 of the top cover 104 around the periphery of the opening 154. Additionally, because the height of the raised central portion 144 (i.e., the x dimension in FIG. 9) is preferably equal to the thickness of the top cover 104, a top surface 162 of the raised central portion 144 is preferably coplanar with the surface 160 of the top cover 104 to provide an additional contact surface for the label or adhesive covering. In this manner, the label need only seal the small gap between the edges 147 and 148 of the raised central portion 144 and the periphery of the opening 154. Furthermore, the nominal top surface 152 of the top plate 124 preferably contacts the underside of the top cover 104 around a majority of the periphery of the opening 154 (FIG. 11) to further aid in sealing the opening 154.

Figure 5:
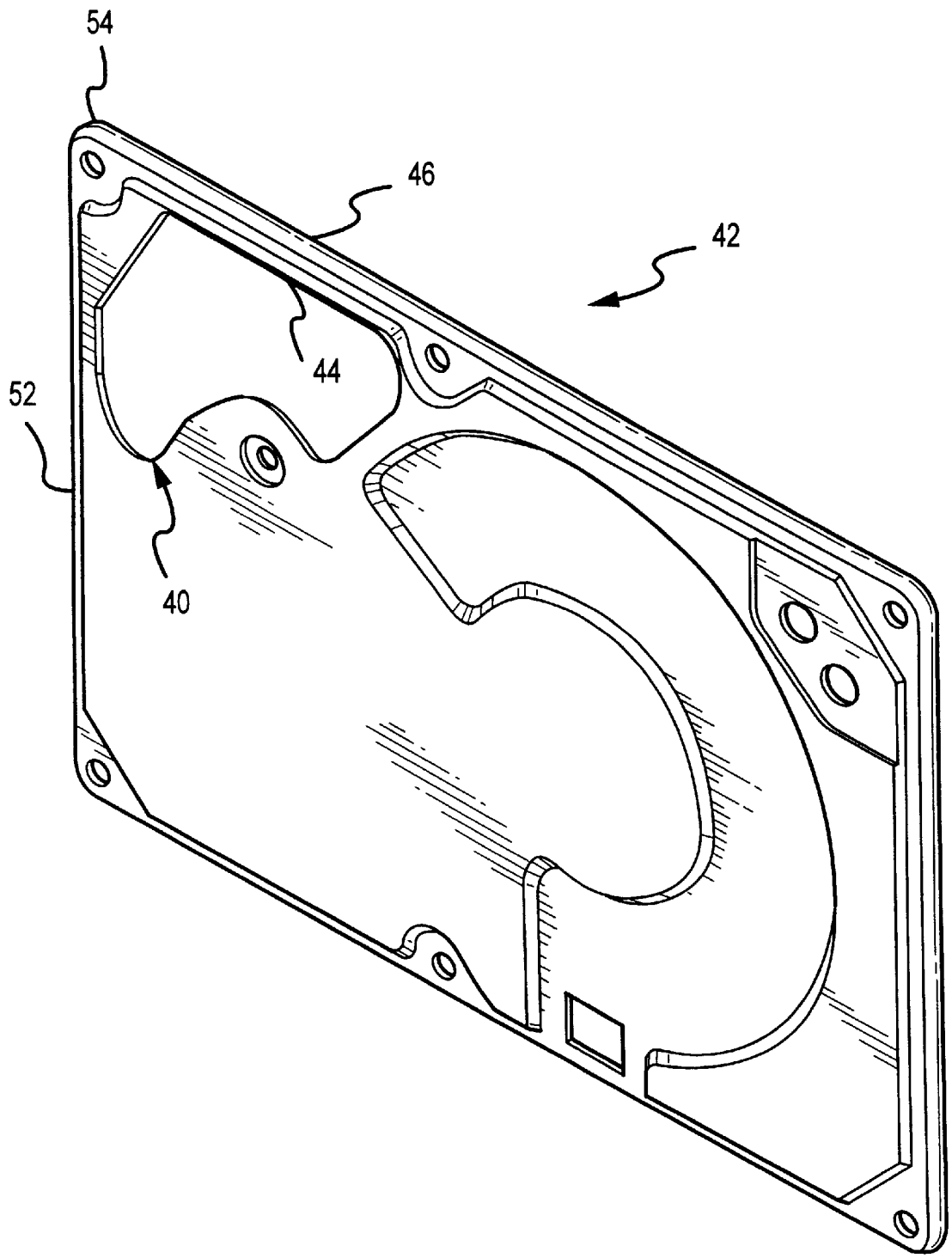
FIG. 5 is an isometric view of a top cover of a disc drive illustrating an opening for receiving a prior art voice coil motor top plate.

FIGS. 5 and 11 illustrate the reduced size of the opening 154 in comparison to the opening 40 in the prior art top cover 42. In addition to enhancing the hermetic seal of the disc drive 100 as described above, the relatively smaller opening 154 does not weaken the structural integrity of the top cover 104 in the manner of the prior art opening 40. Specifically, the opening 154 extends along a much smaller portion of the edge 156 of the top cover 104 in comparison to the prior art opening 40. Additionally, because the rear edge 148 of the raised central portion 144 does not extend to the rear edge 150 of the top plate 124, the periphery of the opening 154 is positioned further away from the edge 156 of the top cover (relative to the prior art opening 40). Thus, the pressure applied to the edge 156 by the gasket 106 does not tend to deform the top cover 104 as is common with the prior art top cover 42.

Although the above description focuses primarily on the top plate 124, the raised central portion 146 of the bottom plate 128 (FIG. 9) also preferably protrudes through an opening (not shown) in the base 102 of the disc drive 100. However, it is not necessary that both plates 124 and 128 be modified to include the respective raised central portions 144 and 146. Indeed, it is understood that the present invention encompasses the inclusion of at least one modified plate within the VCM and that either the top plate 124, the bottom plate 128, or both plates may be modified as described above.

In summary, the modified plates 124 and 128 provide for larger effective z-heights for the VCM assembly by allowing a portion of the plates to protrude through either the top cover 104 or the base 102 of the disc drive 100. The increase in available z-height allows for the use of larger magnets or coils which, in turn, increases the power of the VCM while decreasing the disc drive access time.

TABLE 1

|  | UNIFORM PLATE THICKNESS (VCM Plates Within Drive Case) | MODIFIED TOP PLATE | MODIFIED TOP AND BOTTOM PLATES |
|---|---|---|---|
| TOTAL VCM Z-HEIGHT WITHIN A 9.5 mm DRIVE | 7.2 millimeters | 7.7 millimeters | 8.1 millimeters |
| ACCESS TIME | 10.47 milliseconds | 9.90 milliseconds | 9.46 milliseconds |

Table 1 above illustrates the magnitude of the performance increase which can be achieved by utilizing the modified plates of the present invention with the example 9.5 millimeter disc drive discussed above. The 9.5 millimeter drive has a nominal VCM z-height (i.e., the z-height available for the VCM before any openings are formed in the drive 100) of 7.2 millimeters. For the purposes of the comparison of Table 1, it is assumed that a plate thickness of 2.15 millimeters is required to prevent excessive magnetic flux leakage within the VCM for the selected magnet 126. Thus, Table 1 compares the use of uniform plates (e.g., plates 2.15 millimeters thick) against the modified plates 124 and 128 of the present invention having a nominal thickness of 1.65 millimeters and a peak thickness of 2.15 millimeters along the raised central portions 144 and 146, respectively.

The first column represents the prior art VCM utilizing top and bottom plates of uniform (2.15 millimeters) thickness which are contained completely within the disc drive 100. A VCM using such prior art top and bottom plates produces a disc drive access time of approximately 10.47 milliseconds.

The second column in Table 1 describes a VCM using the same magnet 126 and uniform bottom plate with the improved top plate 124 and the top cover 104 which includes the opening 154 for receiving the raised central portion 144. The use of the modified top plate 124 effectively increases the z-height by the thickness of the top cover 104 (i.e., 0.5 millimeters as described above). This increase in effective z-height (from 7.2 millimeters to 7.7 millimeters) allows for a larger coil 120 and/or magnet 126 to be used within the VCM. However, for the purpose of the comparison in Table 1, the size of the magnet is held constant as is the peak thickness of the plates (i.e., 2.15 millimeters). Thus, the additional z-height provided by the modified top plate 124 is allocated entirely to the coil 120 for the purposes of the present comparison. Once a new, thicker coil 120 has been selected and optimized for use with the VCM, the access time drops from 10.47 milliseconds to 9.90 milliseconds. Thus, the use of just the modified top plate 124 results in a performance increase of greater than 5% in the sample disc drive 100 of Table 1. A still larger performance increase could be achieved if all of the VCM components were changed to make optimal use of the 7.7 millimeter z-height.

The third column in Table 1 describes the use of both the modified top and bottom plates 124 and 128, respectively. Allowing the raised central portion 146 of the bottom plate 128 to protrude through an opening (not shown) in the base 102 provides a similar z-height increase of 0.4 millimeters in our sample 9.5 millimeter disc drive 100. The z-height increase for the modified bottom plate 128 is slightly smaller than that of the modified top plate 124 due to construction constraints in the base 102 which are not encountered in the top cover 104. Thus, the available VCM z-height increases from 7.7 millimeters to 8.1 millimeters when both the modified top and bottom plates 124 and 128 are utilized. As described above, the increase in z-height is allocated entirely to the coil 120 for the comparison of Table 1 since the use of a larger magnet 126 would in turn require thicker plates 124 and 128 to accommodate the higher levels of magnetic flux. Table 1 illustrates that access time drops to 9.46 milliseconds once the coil 120 is optimized for the larger effective z-height. Thus, the use of both modified plates provides a performance increase of nearly 10% over the use of uniform plates when those plates are contained entirely within the interior volume of the drive.

Figure 6:
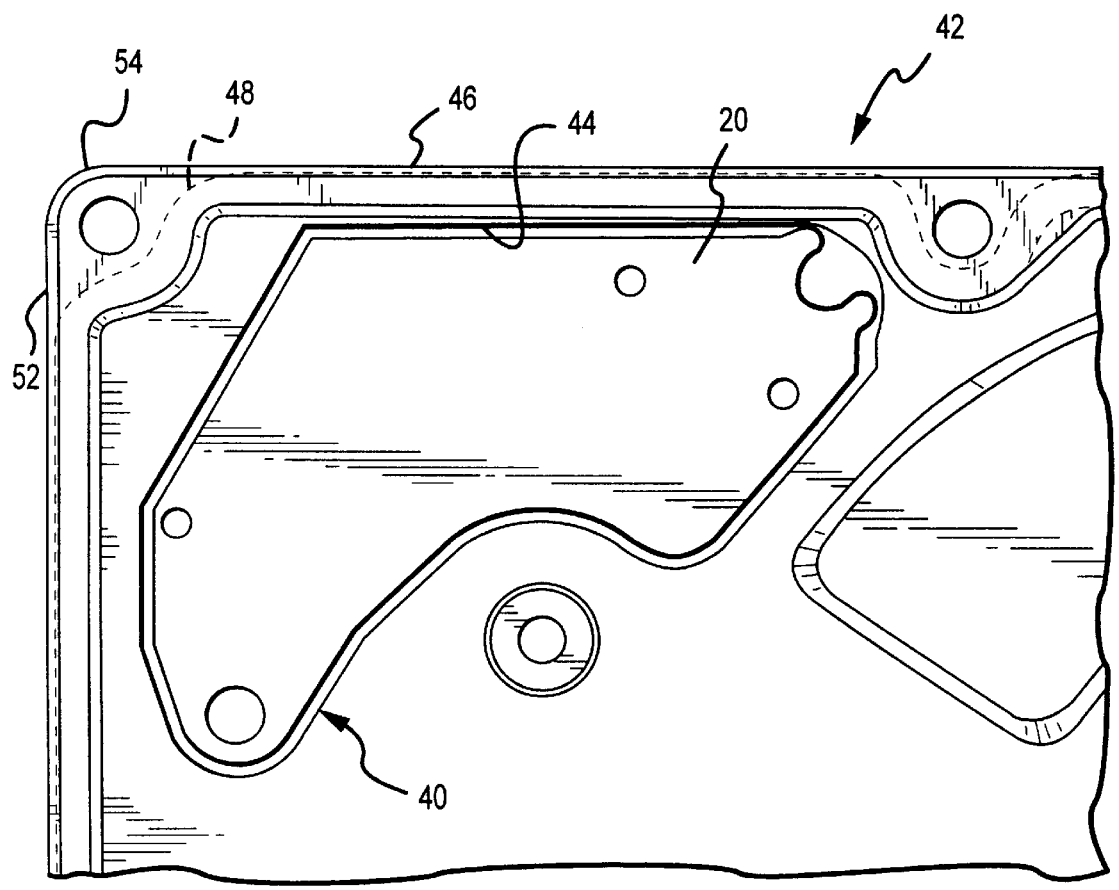
FIG. 6 is an enlarged top plan view of a portion of the top cover shown in FIG. 5 illustrating the position of the prior art top plate within the opening.

Although similar performance gains could be achieved by utilizing uniform plates which extend through large openings in the disc drive case (such as the plate 20 which extends through the opening 40 in the top cover 42 shown in FIG. 6), such large openings are problematic for both the structural integrity of the disc drive as well as the integrity of the hermetic seal within the disc drive, as described above. Therefore, the improved plates 124 and 128 of the present invention can accommodate substantially the same magnetic flux as plates having a uniform cross section while not requiring the large openings found in prior art disc drives.

In summary, the preferred embodiment disclosed herein is directed to an apparatus for increasing the magnetic flux capacity and thus the power of a voice coil motor (such as 122) for a disc drive (such as 100) without increasing the height of the disc drive. The disc drive is provided with a case (such as 102 and 104) defining a maximum interior or z-height for mounting a voice coil motor within the disc drive. The voice coil motor (such as 122) includes a magnet (such as 126), a coil (such as 120) attached to the case to move relative to the magnet, and top and bottom plates (such as 124 and 128) centered in position above and below the magnet, respectively. The top and bottom are formed from a magnetically permeable material to carry magnetic flux in a circuit with the magnet. At least one of the top and bottom plates (such as 124 or 128) includes a raised central portion (such as 144 or 146) having an increased cross-sectional area in relation to the remainder of the plate to increase the magnetic flux capacity of the central portion of the plate. An opening (such as 154) formed in the disc drive case (such as 104) accommodates the raised central portion (such as 144) of the plate (such as 124), thereby increasing the effective height of the plate without altering the outer dimensions of the disc drive.

In another preferred embodiment of the present invention, the coil (such as 120) moves in an arc relative to the magnet (such as 126) and a midpoint of the arc coincides with a centerline dividing the magnet between North and South poles (such as 134 and 136). The raised central portion (such as 144) is substantially centered about the magnet centerline.

In another preferred embodiment of the present invention, the raised central portion (such as 144) has a height substantially equal to a thickness of the case (such as 104).

In another preferred embodiment of the present invention, the magnet (such as 126) is curved to cover an arc of $\Theta$ degrees. The top and bottom plates (such as 124 and 128) are also curved to cover the entire surface area of the magnet. The raised central portion (such as 144) follows the curve of the plate (such as 124) and covers an arc of $\Phi$ degrees where the angle $\Phi$ is smaller than the angle $\Theta$.

In another preferred embodiment of the present invention, the angle $\Phi$ is between 30 and 60 percent of the angle $\Theta$, and in one preferred embodiment, the angle $\chi$ is approximately 40 percent of the angle $\Theta$.

In another preferred embodiment of the present invention, the top plate (such as 124) includes a rear edge (such as 150) adapted for placement adjacent an edge (such as 156) of the 148) extending adjacent to the rear edge (such as 150) of the top plate (such as 124). In one preferred embodiment, the rear edge (such as 148) of the raised central portion (such as 144) is separated from the rear edge (such as 150) of the top plate (such as 124) by a distance of at least 1 millimeter.

A further preferred embodiment of the present invention includes a disc drive (such as 100) having a voice coil motor (such as 122) where both the top and the bottom plates (such as 124 and 128) include a raised central portion (such as 144 and 146) for carrying additional magnetic flux within the circuit defined by the plates (such as 124 and 128) and the magnet (such as 126). A base (such as 102) of the disc drive (such as 100) includes an opening for receiving the raised central portion (such as 146) of the bottom plate (such as 128), while a top cover (such as 104) of the disc drive (such as 100) includes an opening (such as 154) for receiving the raised central portion (such as 144) of the top plate (such as 124).

A further embodiment of the present invention is directed to a disc drive (such as 100) having a base (such as 102) and a top cover (such as 104) to seal an interior volume of the disc drive and to define a maximum interior height within the disc drive. A voice coil motor (such as 122) includes a magnet (such as 126), a coil (such as 120) pivotably mounted to move relative to the magnet, a top plate (such as 124) fixed above the coil and a bottom plate (such as 128) fixed below the coil. The disc drive (such as 100) further includes means for increasing the magnetic flux capacity of at least one of the top and bottom plates (such as 124 or 128) without increasing the maximum interior height of the disc drive.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A voice coil motor for a disc drive, the disc drive including a case to seal an interior volume of the disc drive, and the voice coil motor comprising:
   a magnet;
   a coil adapted to move in an arc proximate to the magnet;
   a bottom plate positioned below the coil; and
   a top plate positioned above the coil and having a first length, the top plate including a raised central portion having a second length shorter than the first length, the raised central portion extending vertically upward and away from the magnet for extension through an opening defined in a top cover of the case.

2. A voice coil motor as defined in claim 1 wherein:
a midpoint of the arc coincides with a centerline dividing the magnet between North and South poles; and
the raised central portion is substantially centered about the magnet centerline.

3. A voice coil motor as defined in claim 2 wherein:
the raised central portion has a planar top surface and a height substantially equal to a thickness of the case, the planar top surface adapted to be substantially coplanar with an outer surface of the top cover of the case when the raised central portion is extended through the opening.

4. A voice coil motor as defined in claim 1 wherein:
the top plate includes a rear edge adapted for placement adjacent an edge of the case; and
the raised central portion includes a rear edge extending adjacent to the rear edge of the top plate.

5. A voice coil motor as defined in claim 4 wherein the rear edge of the top plate and the rear edge of the raised central portion are separated by a distance of at least 1 millimeter.

6. A voice coil motor as defined in claim 1 wherein the second length is less than sixty percent of the first length.

7. A voice coil motor for a disc drive, the disc drive including a case to seal an interior volume of the disc drive, the voice coil motor comprising:
a magnet curved to cover an arc of $\Theta$ degrees;
a coil adapted to move in an arc proximate to the magnet, wherein a midpoint of the arc coincides with a centerline dividing the magnet between North and South poles;
a bottom plate positioned below the coil and curved to cover the entire surface area of the magnet; and
a top plate positioned above the coil and curved to cover the entire surface area of the magnet, the top plate including a raised central portion substantially centered about the magnet centerline and curved to cover an arc of $\Phi$ degrees where the angle $\Phi$ is smaller than the angle $\Theta$, the raised central portion adapted to extend through an opening defined in a top cover of the case.

8. A voice coil motor as defined in claim 7 wherein the angle $\Phi$ is between 30 and 60 percent of the angle $\Theta$.

9. A voice coil motor as defined in claim 8 wherein the angle $\Phi$ is approximately 40 percent of the angle $\Theta$.

10. A voice coil motor as defined in claim 9 wherein the angle $\Phi$ is approximately 40 degrees and the angle $\Theta$ is approximately 100 degrees.

11. A voice coil motor as defined in claim 7 wherein the bottom plate includes a raised central portion extending vertically downward and away from the magnet for extension through an opening defined in a base of the case.

12. A disc drive comprising:
a case having a top cover and a base to seal an interior volume of the disc drive;
a magnet;
a coil pivotably mounted within the case to move in an arc proximate to the magnet;
a top plate fixed to the case above the coil; and
a bottom plate fixed to the case below the coil, at least one of the top and bottom plates having a first length and including a raised central portion having a second length shorter than the first length, the raised central portion extending away from the magnet and extending through an opening defined in one of the top cover and the base of the case.

13. A disc drive as defined in claim 12 wherein:
a midpoint of the arc coincides with a centerline dividing the magnet between North and South poles; and
the raised central portion is substantially centered about the magnet centerline.

14. A disc drive as defined in claim 13 wherein:
the raised central portion has a planar top surface and a height substantially equal to a thickness of the case so that the planar top surface of the raised central portion is coplanar with an outer surface of the one of the top cover and the base of the case through which the raised central portion extends.

15. A disc drive as defined in claim 13 wherein:
the raised central portion is located on the top plate;
the top plate includes a rear edge positioned adjacent an edge of the case; and
the raised central portion includes a rear edge extending adjacent to the rear edge of the top plate.

16. A disc drive as defined in claim 15 wherein the rear edge of the top plate and the rear edge of the raised central portion are separated by a distance of at least 1 millimeter.

17. A disc drive as defined in claim 13 wherein:
the raised central portion extends vertically upward through an opening defined in the top cover; and
the bottom plate includes a second raised central portion extending vertically downward through an opening defined in the base.

18. A disc drive comprising:
a case having a top cover and a base to seal an interior volume of the disc drive;
a magnet;
a coil pivotably mounted within the case to move in an arc proximate to the magnet;
a top plate fixed to the case above the coil; and
a bottom plate fixed to the case below the coil, at least one of the top and bottom plates having a first planar surface and a raised central portion having a planar top surface extending away from the magnet through an opening defined in one of the top cover and the base of the case, the first planar surface contacting an inner surface of the case to substantially seal the interior volume of the disc drive around the opening.

19. The disc drive of claim 18 further comprising an adhesive covering extending over a gap defined between the planar top surface of the raised central portion and a perimeter of the opening.

\* \* \* \* \*